(12) United States Patent
Breu et al.

(10) Patent No.: US 11,413,973 B2
(45) Date of Patent: Aug. 16, 2022

(54) ELECTRICAL ENERGY SYSTEM COMPRISING FUEL CELLS

(71) Applicant: AUDI AG, Ingolstadt (DE)

(72) Inventors: Martin Breu, Steinach (DE); Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/266,527

(22) PCT Filed: Jul. 8, 2019

(86) PCT No.: PCT/EP2019/068222
§ 371 (c)(1),
(2) Date: Feb. 5, 2021

(87) PCT Pub. No.: WO2020/030356
PCT Pub. Date: Feb. 13, 2020

(65) Prior Publication Data
US 2021/0309116 A1 Oct. 7, 2021

(30) Foreign Application Priority Data
Aug. 7, 2018 (DE) ...................... 10 2018 213 165.1

(51) Int. Cl.
*B60L 50/75* (2019.01)
*B60L 58/40* (2019.01)
*H02M 3/158* (2006.01)

(52) U.S. Cl.
CPC ............. *B60L 50/75* (2019.02); *B60L 58/40* (2019.02); *H02M 3/158* (2013.01); *B60L 2210/10* (2013.01)

(58) Field of Classification Search
None
See application file for complete search history.

(56) References Cited

U.S. PATENT DOCUMENTS

| 2004/0219702 A1* | 11/2004 | Nagai | ............... H01L 21/02579 438/46 |
| 2013/0288148 A1* | 10/2013 | Kazuno | ............. H01M 8/04619 429/444 |
| 2014/0226377 A1* | 8/2014 | Goetz | ................. H02M 3/1582 363/65 |
| 2016/0152129 A1* | 6/2016 | West | ........................ B60L 5/36 307/10.1 |

(Continued)

FOREIGN PATENT DOCUMENTS

| DE | 10 2006 056 888 A1 | 6/2008 |
| DE | 10 2011 007 339 A1 | 10/2012 |

(Continued)

*Primary Examiner* — Jared Fureman
*Assistant Examiner* — Joel Barnett
(74) *Attorney, Agent, or Firm* — Seed IP Law Group LLP

(57) ABSTRACT

An electrical energy system includes fuel cells and a battery, as well as a DC converter arranged between the fuel cell and the high-voltage battery, wherein the DC converter is a buck-boost converter, having two series-connected semiconductor switches in one of its two current pathways, between which an inductance is connected, which joins the two current pathways of the DC converter. A related method for operating an electrical energy system for a motor vehicle is also provided.

9 Claims, 1 Drawing Sheet

(56) References Cited

U.S. PATENT DOCUMENTS

2017/0166081 A1\* 6/2017 Kwon ............... H01M 8/04947
2018/0326865 A1\* 11/2018 Yoon ....................... B60L 58/40

FOREIGN PATENT DOCUMENTS

| DE | 10 2011 108 920 A1 | 1/2013 |
|----|---------------------|--------|
| DE | 10 2014 109 802 A1 | 4/2015 |
| DE | 10 2013 224 544 A1 | 6/2015 |
| DE | 10 2015 011 897 A1 | 4/2016 |
| DE | 10 2016 219 493 A1 | 4/2018 |
| DE | 10 2018 202 106 A1 | 8/2019 |

\* cited by examiner

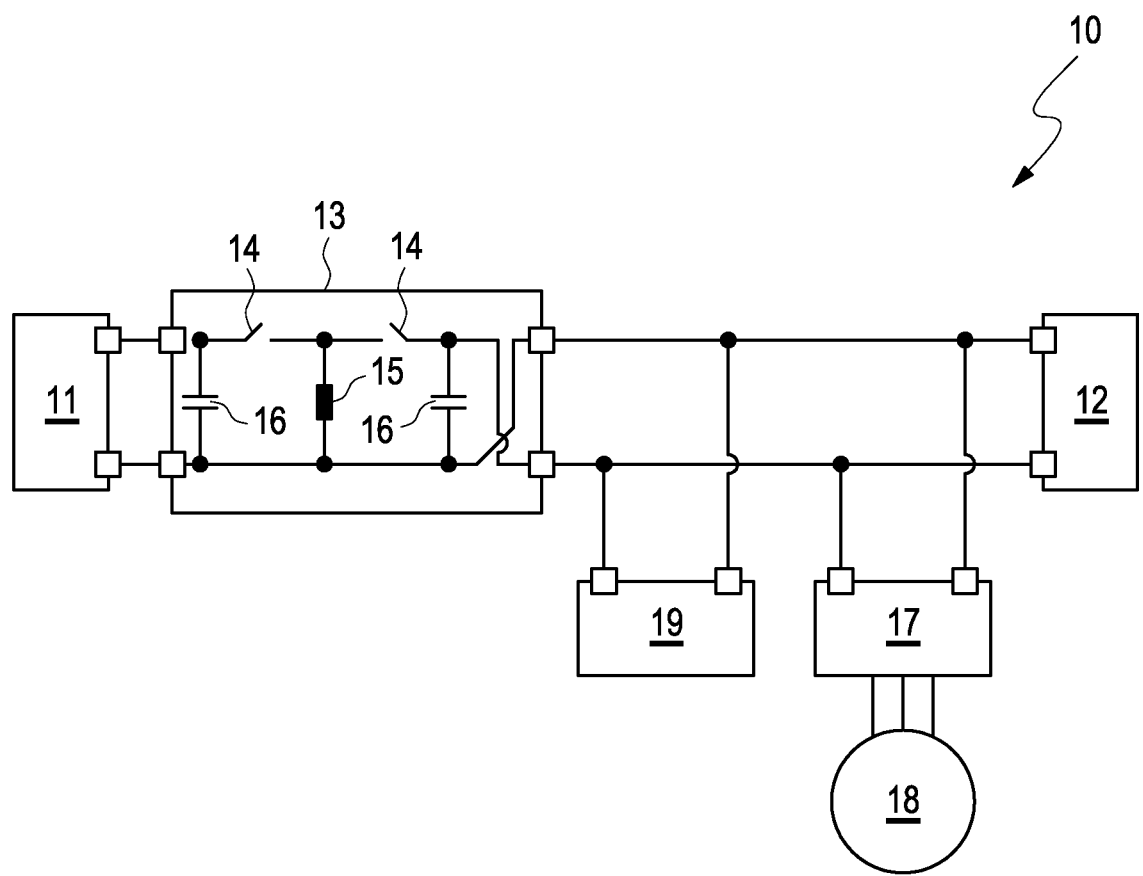

ELECTRICAL ENERGY SYSTEM COMPRISING FUEL CELLS

BACKGROUND

Technical Field

Embodiments of the invention relate to an electrical energy system containing fuel cells and a method for operating an electrical energy system for a motor vehicle.

Description of the Related Art

In mobile fuel cell applications, such as fuel cell vehicles, the energy system with the high-voltage circuit (HV circuit) usually comprises two energy accumulators. In general, the fuel cell (FC) is one of the two energy accumulators and a HV-battery is the second energy accumulator. Since the fuel cell has a heavily load-dependent voltage, it is usually coupled to the HV-battery across a DC converter (DC/DC converter). The DC/DC converter evens out the different voltages of FC and HV-battery. The DC/DC converter is usually designed as a boost converter, which is able to boost the output voltage of the FC to the voltage level of the HV-battery. In order to guarantee the most optimal possible voltage supply of the consumers connected to the energy system, such as the drive systems of the fuel cell vehicle, they are generally supplied with current from the circuit of the HV-battery.

However, a boost converter is only able to boost the voltage. If the FC voltage is higher than that of the battery at one operating point, the two HV accumulators would be coupled hard across the diodes of the DC/DC converter. This should be avoided. In many energy systems, the HV-battery is dimensioned such that the voltage of the FC is higher than that of the HV-battery at certain operating points, but at other operating points the voltage of the HV-battery is higher than that of the FC. In this case, a full-bridge converter is usually employed as the DC/DC converter, requiring a greater component expense than a boost converter. In addition to the switching elements of a boost converter, an additional switch and an additional diode are needed. This increases volume, weight, and costs of the energy system. The additional components cause a higher actuating and computing expense as compared to a boost converter. Due to the difficult control capability at voltage parity, the robustness of the energy system is decreased.

Embodiments of the present invention provide devices and methods which at least partly eliminate the described shortcomings.

DE 10 2013 224 544 A1 discloses a hybrid system and a method for operating a hybrid system. The hybrid system comprises a fuel cell, a storage battery and a supplemental battery, which can be optionally coupled to or decoupled from the storage battery. The supplemental battery can be connected to the storage battery or the fuel cell across a buck-boost converter for its charging.

From DE 10 2011 007 339 A1 there is known a power supply circuit arrangement for generating an on-board voltage of a vehicle from the voltage of a high-voltage battery, in which a voltage converter takes on the duties of the alternator. The arrangement comprises a first voltage converter, formed by means of a synchronous rectifier and drawing energy from the high-voltage battery, and a second voltage converter, designed as an inverting DC converter and furnishing an operating voltage for the operation of a reverse polarity protection circuit of the arrangement. The second voltage converter is connected to an energy accumulator, which is charged in event of reverse polarity.

From DE 10 2011 108 920 A1 there is known an electrical inverter system for power supply systems, which is composed of individual modules. The inverter system comprises multiple modules with intermediate modules in which a buck-boost converter ensures a loss-free voltage equalization.

BRIEF SUMMARY

According to some embodiments of the invention, the full-bridge converter topology of the DC/DC converter has been replaced by the buck-boost converter topology in order to achieve the most loss-free and suitable connection even in event of overlapping voltage ranges of the HV-battery and the fuel cell. This makes possible a coupling by means of low component expense and low actuator expense.

Some embodiments relate to an energy system for a vehicle. The energy system comprises at least one fuel cell 11; at least one HV-battery; and a DC converter (DC/DC converter) arranged between the at least one fuel cell and the at least one HV-battery. The DC converter is a buck-boost converter, having two series-connected semiconductor switches in one of its current pathways, between which an inductance is connected, which joins the two current pathways of the DC converter.

In one embodiment, the buck-boost converter comprises two semiconductor switches, an inductance, and two capacitances. In one embodiment, the semiconductor switches comprise at least one IGBT or a MOS-FET. In the converter topology described herein, one of the two semiconductor switches blocks the sum of the HV-battery voltage and the fuel cell voltage when the other of the semiconductor switches is switched to be conducting. Thanks to this characteristic, the semiconductor switches in the buck-boost converter in one embodiment are made from semiconductor materials with wide band gap (wide-bandgap semiconductors). The semiconductor material in one embodiment of the energy system is silicon carbide, in another embodiment it is gallium nitride. Switches made from these semiconductor materials have especially good performance at higher voltages (such as 900 V or 1200 V).

In one embodiment, the energy system has an operating voltage in the range of 800 V to 1500 V, especially 900 V to 1200 V.

Some embodiments relate to a method for operating an energy system as described herein, wherein one of the semiconductor switches of the buck-boost converter is switched to be conducting that is situated closer to the energy source with the presently higher output voltage, and one of the semiconductor switches of the buck-boost converter is blocked that is closer to the energy source with the presently lower output voltage. Both semiconductor switches are switched to be conducting when the output voltage of both energy sources is the same.

Among the benefits of the energy system and method described herein is less expense for components and actuators, making possible a more cost-effective implementation than when using a full-bridge converter. Moreover, the energy system has good regulating ability, thanks to a smooth transition when the voltage is equal between the fuel cell and the HV-battery. Further benefits and embodiments will emerge from the specification and the accompanying drawing.

Of course, the above mentioned and the following yet to be explained features can be used not only in the particular indicated combination, but also in other combinations or standing alone.

BRIEF DESCRIPTION OF THE SEVERAL VIEWS OF THE DRAWINGS

Embodiments of the invention are further described with reference to the drawing.

FIG. 1 illustrates a schematic representation of one embodiment of an energy system with consumers connected to it.

DETAILED DESCRIPTION

FIG. 1 shows a schematic representation of one embodiment of an energy system 10 with consumers 17, 18, 19 connected to it. The energy system 10 comprises, as its energy sources, a fuel cell 11 and a HV-battery 12. These are connected across a DC converter 13 configured as a buck-boost converter. The DC/DC converter 13 comprises two semiconductor switches 14, an inductance 15 connected between the semiconductor switches 14, such as a storage choke, and two capacitances 16, which are arranged at the input and output of the DC/DC converter 13, respectively. Pulse inverters 17 and electric motors 18 are connected to the energy system 10, along with other HV components 19, such as ancillary units of the fuel cell, charging device, 12V DC/DC converter, HV heater, electrical air conditioner compressors, etc.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An energy system for a vehicle, comprising:
   at least one fuel cell;
   at least one high-voltage battery; and
   a DC converter arranged between the at least one fuel cell and the at least one high-voltage battery,
   wherein the DC converter is a buck-boost converter, having:
   a first current pathway:
   a second current pathway;
   a first semiconductor switch in the first current pathway proximal to the at least one fuel cell and distal to the at least one high-voltage battery;
   a second semiconductor switch connected in series with the first semiconductor switch in the first current pathway proximal to the at least one high-voltage battery and distal to the fuel cell; and
   an inductor coil led between the first and second semiconductor switches and joining the first and second current pathways, wherein the DC converter is configured to:
   close the first semiconductor switch and open the second semiconductor switch if a voltage of the at least one fuel cell is higher than a voltage of the at least one high-voltage battery; and
   open the first semiconductor switch and close the second semiconductor switch if the voltage of the at least one fuel cell is lower than the voltage of the at least one high-voltage battery.

2. The energy system according to claim 1, wherein the DC converter includes two capacitances.

3. The energy system according to claim 2, wherein the first and second semiconductor switches comprise at least one IGBT or MOS-FET.

4. The energy system according to claim 2, wherein the first and second semiconductor switches are made from a semiconductor material with broad band gap.

5. The energy system according to claim 4, wherein the semiconductor material is silicon carbide.

6. The energy system according to claim 4, wherein the semiconductor material is gallium nitride.

7. The energy system according to claim 1, having an operating voltage in the range of 800 V to 1500 V.

8. A method for operating an energy system of a vehicle, the energy system including a first energy source including at least one fuel cell, a second energy source including at least one high-voltage battery, and a DC converter arranged between the at least one fuel cell and the at least one high-voltage battery, wherein the DC converter is a buck-boost converter, having two series-connected semiconductor switches in one of its two current pathways, between which an inductance is connected, which joins the two current pathways of the DC converter, the method comprising:
   switching a first one of the semiconductor switches of the buck-boost converter that is situated closer to one of the energy sources having a presently higher output voltage than the other of the energy sources to be conducting; and
   blocking a second one of the semiconductor switches of the buck-boost converter that is situated closer to one of the energy sources having a presently lower output voltage than the other of the energy sources.

9. The method according to claim 8, wherein both semiconductor switches are switched to be conducting when the first and second energy sources have the same output voltage.

* * * * *

UNITED STATES PATENT AND TRADEMARK OFFICE
CERTIFICATE OF CORRECTION

| | | |
|---|---|---|
| PATENT NO. | : 11,413,973 B2 | Page 1 of 1 |
| APPLICATION NO. | : 17/266527 | |
| DATED | : August 16, 2022 | |
| INVENTOR(S) | : Martin Breu et al. | |

It is certified that error appears in the above-identified patent and that said Letters Patent is hereby corrected as shown below:

In the Claims

<u>Column 4, Claim 1, Line 3:</u>
"an inductor coil led between" should read: --an inductor coupled between--.

Signed and Sealed this
Thirteenth Day of May, 2025

Coke Morgan Stewart
*Acting Director of the United States Patent and Trademark Office*